United States Patent
Witham et al.

(10) Patent No.: US 6,465,050 B2
(45) Date of Patent: Oct. 15, 2002

(54) NON-CRACKING HYDROPHILIC POLYETHERSULFONE MEMBRANES

(75) Inventors: Michael J. Witham, Grafton; James S. Johnson, Acton, both of MA (US)

(73) Assignee: Osmonics, Inc., Westborough, MA (US)

( * ) Notice: Subject to any disclaimer, the term of this patent is extended or adjusted under 35 U.S.C. 154(b) by 0 days.

(21) Appl. No.: 09/727,629

(22) Filed: Dec. 1, 2000

(65) Prior Publication Data

US 2001/0021421 A1 Sep. 13, 2001

Related U.S. Application Data

(62) Division of application No. 09/246,400, filed on Feb. 8, 1999, now Pat. No. 6,193,077.

(51) Int. Cl.[7] .................................................. C08J 7/18
(52) U.S. Cl. ........................................ 427/491; 427/488
(58) Field of Search ................................ 427/488, 491, 427/385.5, 245, 512; 210/654, 490; 528/499

(56) References Cited

U.S. PATENT DOCUMENTS

| | | | | |
|---|---|---|---|---|
| 4,046,843 A | * | 9/1977 | Sano et al. | 210/500.23 |
| 4,618,533 A | * | 10/1986 | Steuck | 428/315 |
| 4,745,142 A | * | 5/1988 | Ohwaki et al. | 524/87 |
| 4,784,769 A | * | 11/1988 | Giordano, Jr. et al. | 210/500.21 |
| 5,843,789 A | * | 12/1998 | Nomura et al. | 210/490 |
| 6,096,369 A | * | 8/2000 | Anders et al. | 427/2.3 |

* cited by examiner

*Primary Examiner*—Shrive P. Beck
*Assistant Examiner*—Rebecca A. Blanton
(74) *Attorney, Agent, or Firm*—Bruce F. Jacobs

(57) ABSTRACT

A non-cracking hydrophilic polyether sulfone membrane is prepared by (a) directly coating the entire surface of a hydrophobic polyethersulfone membrane with an aqueous solution of a polyalkylene oxide polymer and at least one polyfunctional monomer, and (b) polymerizing the monomer over the entire surface of the membrane under conditions which cause the resulting polymer to attach to the polyethersulfone membrane and the polyethylene oxide to form a non-extractable surface which does not crack when the membrane is folded to form a pleated cartridge.

6 Claims, No Drawings

NON-CRACKING HYDROPHILIC POLYETHERSULFONE MEMBRANES

This application is a divisional of copending application(s) application Ser. No. 09/246,400 filed on Feb. 8, 1999 is now U.S. Pat. No. 6,193,077.

BACKGROUND OF THE INVENTION

This invention relates to a non-cracking polyethersulfone microporous membrane having bulk properties which differ from its surface properties and to a process for preparing the same. The invention relates to the modification of the surface properties of hydrophobic polyethersulfone microporous membranes. In particular, the method includes rendering the hydrophobic surfaces permanently hydrophilic while avoiding causing the membrane to become cracking.

For many porous media applications, a preferred medium must have both certain specific bulk properties and specific surface properties. In many cases, however, a substrate having desirable bulk properties (such as mechanical strength or solvent resistance) has not had appropriate surface properties (such as water wettability, low protein absorbing tendency, thromboresistivity, controlled ion exchange capacity, controlled surface chemical reactivity, and the like). The modification of the surface properties of such substrates has a long history.

One of the oldest methods for modifying surface properties is to coat a porous medium, e.g. a membrane, having desired bulk properties, with an agent having the desired surface properties. This has been done to make an otherwise hydrophobic membrane function as if it is hydrophilic. To deposit a hydrophilic coating, a coating composition including surfactants or other wetting agents is used. This approach to modifying surface properties has generally been found to be undesirable because the resulting coating tends to be temporary and is removed in whole or in part shortly after initial use. Indeed, polymeric membranes treated in this fashion usually can be wetted with water only a single time. In addition, the membranes exhibit a high level of extractables due to removal of the coating. This is unacceptable in many filtration applications, particularly those which entail processing biological fluids which are to be sterilized or subsequently analyzed.

U.S. Pat. No. 4,702,840 discloses a variant of the simple coating composition in that a surface active agent is included in a casting dope which is used to form the basic membrane. This technique usually reduces the rate of extraction of the surfactant, but does not avoid the extraction.

U.S. Pat. No. 4,340,482 discloses a more sophisticated approach in which the surface of a porous membrane formed from hydrophobic fluorine-containing polymers is made hydrophilic by grafting thereto a primary amine, such as glycine. The modified membranes exhibit properties which are undesirable for use with certain materials. For example, the resultant membrane oftentimes has a non-white color and gives off colored extractables during use. Furthermore, the membrane has a tendency to absorb proteins from solution and therefore is unacceptable in applications such as clinical diagnostic assays.

Graft polymerization has been proposed for the modification of the surface characteristics of a polymeric substrate. U.S. Pat. Nos. 3,253,057; 4,151,225; 4,278,777 and 4,311,573 disclose typical examples of such graft polymerizations. However these approaches require high energy ionizing radiation and have not been commercially viable. Moreover, presently available graft polymerization techniques have not succeeded in modifying the entire surface of a porous membrane, i.e. including the portions of the surface located within the pores, while avoiding substantial pore blockage and thereby substantially retaining the porosity of the original membrane.

It would be beneficial to be able to modify the surfaces of porous media by the polymerization of monomers in situ. In this approach the copolymerization of more than one monomer can yield properties not available from commercially available polymers. Also the use of polyfunctional monomers can produce highly insoluble polymers which will be highly insoluble in process fluids.

U.S. Pat No. 4,618,533 proposes the conversion of a membrane from hydrophobic to hydrophilic by depositing a cross-linked polymer over the surface of a membrane by free radical polymerization of a monomer in a liquid medium. The method requires the use of a free radical initiator in an amount that is at least 1000% more, preferably 5000 to 25,000% more, than the amount of initiator that would be used in a typical free-radical polymerization. The patent asserts that such a high concentration of initiator is required to limit the length of the polymer chains to avoid plugging of the pores of a membrane while uniformly coating the entire exposed pore surface of the substrate polymer. In view of the large amount of initiator required, the resulting membrane must contain a substantial amount of extractable residual initiator. The membrane must require substantial washing before use to reduce this contaminant.

It would be desirable to develop a method for producing a modified membrane surface while avoiding the presence of any free radical initiator.

U.S. Pat No. 5,468,390 discloses surface modification of a polysulfone membrane by polymerizing a vinyl monomer using ultraviolet light without initiators. The polymerization of a monomer under these conditions is slow because the substrate is opaque to UV light. Moreover, the polymerization can proceed only from the surfaces which actually receive exposure to the UV light. As such, complete polymerization is unlikely and extractables will result.

U.S. Pat. Nos. 4,900,449, 4,964,990, and 5,108,607 describe preparing hydrophilic polyethersulfone membranes by forming a solution of a hydrophobic polymer starting material and adding a high molecular weight (up to 10,000 daltons) polyethylene glycol prior to casting the polymer into a membrane. The high molecular weight polyethylene glycol is responsible for the initial hydrophilicity of the resulting polyethersulfone membrane. However, under process conditions the high molecular weight polyethylene glycol, a known wetting agent, slowly leaches out and contaminates the filtrate.

Gas plasmas are attractive since roll processing equipment is commercially available and penetration of the porous structure by the gas plasma should initiate rapid surface modification throughout the structure. The direct application of a plasma has long been used to modify porous surfaces, usually with the goal of improved wettability. However, the direct treatment of surfaces by plasma is undesirable in the case of membranes where surface ablation and polymer emcrackingment occur. Also, the use of plasma often produces a surface layer which is easily removed by washing. Thus as the surface layer is extracted, the temporarily wettable surface returns to its original, unmodified state.

It has also been reported that plasma has been proven to be an inadequate technique for modifying the inner surface of pores. M. Gato et al, Journal of Membrane Science, 96, (1994) 299, 307, for instance, reports a failure to modify the inner surface of a hollow fiber membrane with plasma because the "plasma could not penetrate into the hollow fiber membrane." Since hollow fiber membranes commonly have lengths in the range of a few inches to several feet, it is possible that the plasmas used were not sufficient to penetrate the full length of the hollow fiber.

A variety of papers disclose the use of a plasma to induce free radical formation in a porous substrate, usually a polypropylene membrane, followed in a separate step by exposure to a monomer to produce a graft polymerization. This two step process has been found to lead to substrates with completely filled void volume which have had some utility as membranes in pervaporation processes. (Yamaguchi, Nakao, Kimura. Macromolecules 1991, 24, 5522–5527.)

In view of the relative ease of performing plasma processes at low costs, it would be desirable to develop a method in which the inner pore surfaces of a membrane are permanently modified using plasma in a single step process without significant loss of void volume.

U.S. Ser. No. 09/246,234, (Atty. Docket OSM-109, Greenwood) filed on the same day herewith, discloses a method of directly coating the entire, i.e. both internal and external, surface of a porous medium such as a polyethersulfone membrane with a cross-linked polymer by (a) coating the substrate with a solution of one or more polyfunctional polymerizable monomers and (b) exposing the coated porous substrate to a gas plasma which causes polymerization of the monomer in situ over all of the surfaces of the porous structure, the exposure being under conditions which avoid any substantial reduction of the void volume of the porous medium. While the process has been found generally useful with polyethersulfone polymer membranes, when a sufficient amount of polymerized coating is present to produce a permanently wettable product, the resulting membrane has at times exhibited an undesirable behavior. It hasd been found to crack during cutting of the membrane and/or during folding of it to form a pleated cartridge.

Accordingly, it would be highly desirable to provide a composite polyethersulfone membrane having (a) desirable bulk physical strength and chemical resistance, (b) having permanent hydrophilic surface properties over the entire internal surfaces, and also (c) avoiding the cracking problem described above.

SUMMARY OF THE INVENTION

This invention is directed to a non-cracking hydrophilic polyethersulfone membrane prepared by (a) directly coating the entire surface of a hydrophobic polyethersulfone membrane with an alcohol-water solution of a polyalkylene oxide polymer and at least one polyfunctional polymerizable monomer and (b) polymerizing the monomer over the entire surface of the membrane under conditions which cause the resulting polymer to attach to the polyethersulfone membrane and the polyethylene oxide to form a non-extractable surface which does not crack when the membrane is folded to form a pleated cartridge. The surface does not cause any substantial reduction in the void volume of the porous medium.

The polyethersulfone membrane is permanently modified to be hydrophilic and therefore can be used in filtration of any fluids which are compatible with polyethersulfone.

DESCRIPTION OF THE PREFERRED EMBODIMENTS

In accordance with this invention, a hydrophobic polyethersulfone membrane is directly coated about substantially its entire surface with an aqueous solution of a high molecular weight polyalkylene oxide and a polymerizable polyfunctional monomer and then the monomer is plasma polymerized over the entire surface of the membrane under conditions which cause the polyalkylene oxide and monomer coating to form a hydrophilic surface which is permanently adhered to the polyethersulfone membrane while the polyalkylene oxide becomes a non-extractable portion of the coating. The process avoids causing any substantial reduction of the void volume of the membrane.

For purposes of this invention, a membrane is "permanently" hydrophilic if samples thereof remain hydrophilic after each of the following tests:

(a) Dry heat: exposure to 100° C. for one hour;

(b) Steam: autoclaving at 30 psi for one hour;

(c) Water extraction: flowing one liter of water through a 47 mm disk and drying; and (d) Alcohol extraction: flowing one liter of methanol through a 47 mm disk and drying.

For purposes of this invention, a membrane is "hydrophobic" if a sample thereof does not wet out fully within 5 seconds after being floated on a surface of water. Correspondingly, a membrane is "hydrophilic" if a sample thereof does wet out fully within 5 seconds after being floated on a surface of water.

The polyethersulfone membrane is formed as a cast single layer. Generally, the membrane has an average pore size in the range of between about 0.1 and 100 or more micrometers, more usually from about 0.1 to about 20 micrometers.

The polyalkylene oxide polymers used herein have from 2 to about 4 carbon atoms in each repeat unit, e.g. ethylene oxide, propylene oxide, butylene oxide. Suitable polymers have a high molecular weight, i.e. about 25,000 to 1,000,000 daltons or greater, preferably about 75,000 daltons or greater with the upper limit limited only by time for dissolution since the polymers are normally solid at room temperature. Most preferably the polymer is a polyethylene oxide having a molecular weight of about 75,000 to 200,000.

Since plasma induced polymerization of these monomers takes place at reduced pressure, suitable monomers are limited to those with sufficiently low vapor pressure that little is lost by vaporization in the plasma chamber prior to polymerization. A monomer containing two or more polymerizable vinyl ($CH_2$=CH—) groups (either alone or in combination with other monomers including monofunctional monomers) is used since this encourages branching and cross-linking of the polymer produced. Generally such monomers are di-, tri-, or higher acrylates or methacrylates. Examples of suitable such polyfunctional monomers include tetraethyleneglycol diacrylate (TEGDA), pentaerythritol triacrylate, bisphenol A ethoxylate diacrylate, 1,4-butanediol dimethacrylate, and the like.

Tetraethyleneglycol diacrylate (TEGDA) is currently the preferred monomer to render very hydrophobic surfaces (such as PVDF membranes) hydrophilic since it leads to water wettability at lower concentrations than alternatives.

The polyalkylene oxide and polyfunctional monomer are dissolved to form an aqueous solution. When the solution is to be applied to a dry membrane, a small portion of the water is replaced by an alcohol. Suitable alcohols include ethanol, propanol, isopropanol, and the like. The alcohols are used in an amount which both facilitates the dissolution and wets out the surfaces of the polyethersulfone membrane. Generally the solution contains about 5–15% by weight alcohol and 85–95% by weight water. Alternatively, the alcohol can be replaced by any conventional wetting agent/surfactant, generally in an amount of about 0.1 to 2%.

When the solution is to be applied to a membrane which is in a water-wet state, for example from a washing step prior to drying, no alcohol is needed but a conventional wetting agent/surfactant is generally in an amount of about 0.5 to 2% to permit a sufficient but not excessive amount of polyalkylene oxide and polyfunctional monomer to remain on the membrane to produce the desired result of wetting without cracking.

The polyethersulfone membrane can be coated by any conventional means.

The concentrations of the applied polyfunctional monomer and the polyalkylene oxide polymer are sufficiently low as to provide a uniform distribution of plasma-polymerized surface with desirable characteristics while avoiding any deleterious interactions. The concentrations differ depending upon whether the membrane is dry or wet.

When a dry membrane is used, the concentration of the polyfunctional monomer is generally from about 0.1 to about 1 wt % based upon the weight of the treatment solution, preferably from about 0.25 to about 0.75 wt %, more preferably about 0.25 to about 0.5 wt %. The concentration of the polyalkylene oxide polymer is generally from about 0.25 to about 1 wt %, preferably about 0.5 to about 0.75 wt %, which is consistent with achieving the desired result without loss of void volume.

When a wet membrane is used, e.g. prior to drying during membrane manufacture as in Example 3, the concentration of the polyfunctional monomer is generally from about 0.1 to about 0.7 wt % based upon the weight of the treatment solution, preferably from about 0.2 to about 0.5 wt %, more preferably about 0.25 wt %. The concentration of the polyalkylene oxide polymer is generally from about 1 to about 3 wt %, preferably about 1.5 to about 2.5 wt %, which is consistent with achieving the desired result without loss of void volume.

The membrane is preferably dried by any suitable method, e.g. air dried, before being placed in a plasma generator chamber and suspended between the electrodes thereof. Since the plasma generator operates at a relatively high vacuum the monomer employed must be sufficiently non-volatile that serious loss by vaporization does not occur prior to polymerization.

Suitable plasma generators are commercially available. Desirably, the plasma generator has the capacity to process entire rolls of substrate. After placing the monomer-coated membrane into the plasma gerator chamber, the chamber is pumped down to a suitable pressure, e.g. a vacuum of about 0.2 Torr. Pressures greater than about 0.75 Torr are not recommended. Suitable plasmas include but are not limited to those selected from the group of oxygen, nitrogen, argon, and air. Nitrogen plasma is preferred.

Plasma is generated at a voltage that causes the polyfunctional monomer to polymerize into a cross-linked polymer coating over the entire surface of the substrate without serious reduction in the void volume of the substrate, i.e. there is substantially no reduction in the flow rate of a liquid through the structure. Preferably, the plasma is generated at the lowest voltage and for the shortest period of time that leads to the successful polymerization of the monomer. The voltage will vary and can be determined with routine experimentation. A suitable power range for the plasma is from about 100 to about 1000 watts, preferably about 400 to 750 watts. The monomer-coated membrane is subjected to plasma conditions for a period from about 5 to 90 seconds, usually from about 30 to about 60 seconds.

To determine if the coated membrane is hydrophilic and if the hydrophilicity is permanent, the product is evaluated under extreme conditions of dry and wet heat as well as water and alcohol extraction. A membrane is permanently hydrophilic if samples thereof remain hydrophilic after each of the following tests:

(a) Dry heat: exposure to 100° C. for one hour;
(b) Steam: autoclaving at 30 psi for one hour;
(c) Water extraction: flowing one liter of water through a 47 mm disk and drying; and
(d) Alcohol extraction: flowing one liter of methanol through a 47 mm disk and drying.

To determine if a coated membrane is non-cracking, it is evaluated by a crack-on-fold test. Specifically, a sample of the membrane is creased/folded by hand and the resulting fold made sharp with light hand pressure. If the membrane cracks, it has failed the test.

The method of the invention further includes any variation which will enable a user of the invention to plasma-polymerize monomers over substantially the entire surface of a porous substrate in a way that does not substantially reduce the void volume of that substrate.

Having now generally described the invention, the same will become better understood by reference to specific examples, which are included herein for the purposes of illustration only and are not intended to be limiting of the invention. All parts and percents are by weight unless otherwise specified. Unless otherwise noted all membranes were produced by Osmonics and all dyes and monomers were obtained from Aldrich Chemical.

EXAMPLE 1

In this example, a hydrophobic 0.2 polyethersulfone membrane having an average flow rate of 3.13 ml/min-cm$^2$-psi is provided with a permanent hydrophilic surface made by depositing a water/alcohol solution of tetraethyleneglycol diacrylate (TEGDA) monomer and polyethylene oxide polymer over the entire surface in accordance with the invention, drying the coated membrane, placing the dried membrane in a nitrogen plasma generator, and plasma treating.

Dry membrane samples are coated with 95/5 water/ethanol solutions containing varying amounts of TEGDA and polyethylene oxide having a molecular weight of 100,000 daltons and then dried by conventional means. The coated membranes are then placed in the chamber of a plasma generator. The pressure of the chamber is pumped down to about 0.2 Torr. The membranes are then plasma-treated in nitrogen gas at 500 watts for 30 seconds.

Afterwards the samples are tested for wettability by floating on a surface of water. If they wet out fully in about 5 seconds or less, they are considered hydrophilic. They are also tested for flow rate by determining the time for 1 l of water to pass through a 47 mm disk. Finally, they are tested for cracking by the crease and fold test described above. The results are shown in Table I.

TABLE I

| % PEO | % TEGDA | Initial Wetting | Passes Wetting Tests | Flow Rate (ml/min-cm$^2$-psi) | Cracking |
|---|---|---|---|---|---|
| 0 | 0 | No | No | 3.13 | No |
| 0 | 5 | Yes | Yes | 2.91 | Yes |
| 0 | 2 | Yes | Yes | 3.04 | Yes |
| 2 | 0 | Yes | Yes | 0.97 | No |

TABLE I-continued

| % PEO | % TEGDA | Initial Wetting | Passes Wetting Tests | Flow Rate (ml/min-cm²-psi) | Cracking |
|---|---|---|---|---|---|
| 1 | 0 | Yes | Yes | 2.58 | No |
| 0.5 | 0.25 | Yes | Yes | 3.15 | No |
| 0.5 | 0.125 | Yes | Yes | 3.08 | No |
| 0.5 | 0.5 | Yes | Yes | 3.01 | Yes |

The results indicate that the use of a combination of PEO and TEGDA in the proper amounts can impart permanent water wettability to a PES membrane without restricting the flow rate and without cracking. While the samples above with PEO alone were hydrophilic immediately after the plasma treatment, they reverted to hydrophobic after being subjected to the extraction conditions.

EXAMPLE 2

The procedure of Example 1 is repeated except that the alcohol of the coating solution is replaced by various wetting agents. The wetting agents and amounts used are specified in Table II along with the evaluations of the membranes. All samples wet immediately after plasma processing.

TABLE II

| % PEO | % TEGDA | Wetting Agent | Passes Wetting Tests | Flow Rate (ml/min-cm²-psi) | Cracking |
|---|---|---|---|---|---|
| 0 | 0 | none | No | 3.13 | No |
| 0.5 | 0.25 | 1% PVP* | Yes | 2.99 | No |
| 0.5 | 0.25 | 0.25% STATEXAN K1* | Yes | 3.04 | No |
| 0.5 | 0.25 | 1% TRITON DF-12* | Yes | 3.05 | No |

PVP is polyvinyl pyrolidone;
STATEXAN K1 is N-alkyl sulfonic acids sodium salts from Mobay Corporation;
TRITON DF-12 is modified polyalkoxylate surfactant from Union Carbide.

PVP is polyvinyl pyrolidone; STATEXAN K1 is N-alkyl sulfonic acids sodium salts surfactant from Mobay Corporation; TRITON DF-12 is modified polyalkoxylate surfactant from Union Carbide.

EXAMPLE 3

The procedure of Example 1 is repeated but rather than placing a dry membrane into the PEO/TEGDA solution, a water wet membrane is treated in-line during casting, i.e. after rinsing and before drying. The compositions evaluated and the flow rate test results are shown in Table III. Since the membranes are already water wet, no alcohol is used in the treating solution. All samples are hydrophilic immediately after plasma processing.

TABLE III

| % PEO | % TEGDA | Wetting Agent | Passes Wetting Tests | Flow Rate (ml/min-cm²-psi) | Cracking |
|---|---|---|---|---|---|
| 0 | 0 | none | No | 2.98 | No |
| 0.5 | 0.25 | none | No | 3.02 | No |
| 1 | 0.25 | none | No | 3 | No |
| 2 | 0.25 | none | No | 2.96 | No |
| 3 | 0.25 | none | Yes | 2.45 | No |
| 2 | 0.25 | 0.25% STATEXAN K1 | No | 2.96 | No |
| 2 | 0.5 | none | No | 2.89 | No |
| 2 | 0.75 | none | Yes | 2.99 | Yes |
| 2 | 0.25 | 1% PVP | Yes | 2.97 | No |
| 2 | 0.25 | 1% TRITON DF-12 | Yes | 3.03 | No |

COMPARATIVE EXAMPLE A

The procedure of Example 1 was repeated except that the high molecular weight polyethyleneoxide polymer was replaced by a version having a molecular weight of only 10,000 daltons.

At all levels of the low molecular weight polyethylene oxide, none of the polyether sulfone membranes pass the wetting tests and are permanently wettable.

What is claimed is:

1. A method for modifying the inner and outer surfaces of a porous polyethersulfone medium comprising the steps of:

(a) coating a porous polyethersulfone medium having an average pore size in the range of between about 0.1 and 100 micrometers with a solution containing 0.25–3 wt % of polyalkene oxide polymer and 0.1–1 wt % of a monomer having at least two polymerizable vinyl groups which are capable of polymerizing upon exposure to plasma;

(b) placing the coated porous medium in plasma processing equipment; and (c) plasma-polymerizing the monomer in-situ to form a modified surface atop the entire porous medium under conditions which avoid any substantial reduction of void volume, wherein the modified porous medium is non-cracking when folded for use as a pleated cartridge filter and has a permanent non-extractable hydrophilic coating.

2. The method of claim 1, wherein the monomer is a di- or tri- or tetra-acrylate or methacrylate.

3. The method of claim 1, wherein the coating of the membrane comprises contacting the membrane with an aqueous solution containing a monomer selected from the group consisting of tetraethyleneglycol diacrylate, pentaerythritol triacrylate, bisphenol A ethoxylate diacrylate, and 1,4-butanediol dimethacrylate.

4. The method of claim 1, wherein the monomer is tetraethyleneglycol diacrylate.

5. The method of claim 1, wherein the coating of the membrane comprises contacting it with a solution having the monomer or monomers in a concentration that is sufficiently high that, after plasma-polymerization, a permanently hydrophilic surface is produced.

6. The method of claim 1, wherein the plasma-polymerizing entails subjecting the monomer-coated membrane to a plasma at room temperature for at least 10 seconds, at a power of from about 50 to watts, in a vacuum of from about 0.1 Torr to about 0.75 Torr.

* * * * *